(12) United States Patent
Kasai et al.

(10) Patent No.: US 9,598,886 B2
(45) Date of Patent: Mar. 21, 2017

(54) ELECTRONIC DEVICE

(71) Applicant: FUJITSU LIMITED, Kawasaki-shi, Kanagawa (JP)

(72) Inventors: Koichi Kasai, Kawasaki (JP); Shigeru Yamaguchi, Kawasaki (JP); Kazunori Murayama, Ichikawa (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/189,484

(22) Filed: Feb. 25, 2014

(65) Prior Publication Data
US 2014/0290009 A1    Oct. 2, 2014

(30) Foreign Application Priority Data
Mar. 27, 2013    (JP) ................. 2013-067665

(51) Int. Cl.
  *E05D 3/06* (2006.01)
  *E05D 3/12* (2006.01)
  *H04M 1/02* (2006.01)
(52) U.S. Cl.
  CPC .............. *E05D 3/12* (2013.01); *H04M 1/022* (2013.01); *Y10T 16/557* (2015.01)
(58) Field of Classification Search
  CPC ............................... E05D 3/12; G06F 1/1681
  USPC .......................................... 16/366, 354, 386
  See application file for complete search history.

(56) References Cited

U.S. PATENT DOCUMENTS 3,191,218 A * 6/1965 Skiba .............................. 16/366
6,253,419 B1 * 7/2001 Lu .................................. 16/340
8,959,716 B2 * 2/2015 Hsu ................................ 16/302
2010/0188350 A1   7/2010 Sawada
2010/0259494 A1  10/2010 Kii
(Continued)

FOREIGN PATENT DOCUMENTS

CN          101534331 A     9/2009
JP        2006-228812 A     8/2006
(Continued)

OTHER PUBLICATIONS

Extended European Search Report dated Feb. 18, 2015, issued in corresponding KR Patent Application No. 14157516.7 (7 pages).
(Continued)

*Primary Examiner* — David E Sosnowski
*Assistant Examiner* — Jason W San
(74) *Attorney, Agent, or Firm* — Westerman, Hattori, Daniels & Adrian, LLP

(57) ABSTRACT

An electronic device includes a first casing rotatably supported by a first rotation axis, a second casing rotatably supported by a second rotation axis that is parallel to the first rotation axis, a first cam that is provided on the first rotation axis, rotates about the first rotation axis in accordance with rotation of the first casing, and causes the first casing to move together with the first rotation axis in a direction away from the second rotation axis, a second cam that is provided on the second rotation axis, rotates about the second rotation axis in accordance with rotation of the second casing, and causes the second casing to move together with the second rotation axis in a direction away from the first rotation axis, and an elastic member that applies a force in a direction in which the first rotation axis and the second rotation axis become closer.

7 Claims, 17 Drawing Sheets

(56) References Cited

U.S. PATENT DOCUMENTS

| | | | |
|---|---|---|---|
| 2011/0157780 A1* | 6/2011 | Wang et al. | 361/679.01 |
| 2011/0265288 A1* | 11/2011 | Chiang | 16/341 |
| 2012/0046076 A1 | 2/2012 | Masser et al. | |
| 2012/0137471 A1* | 6/2012 | Kujala | 16/382 |
| 2013/0016492 A1* | 1/2013 | Wang et al. | 361/820 |
| 2013/0135809 A1* | 5/2013 | Uchiyama et al. | 361/679.09 |
| 2013/0135827 A1* | 5/2013 | Chao et al. | 361/747 |
| 2013/0170108 A1* | 7/2013 | Lin | 361/679.01 |

FOREIGN PATENT DOCUMENTS

| | | |
|---|---|---|
| JP | 2009-71588 A | 4/2009 |
| JP | 2009-222079 A | 10/2009 |
| JP | 2010-250463 A | 11/2010 |
| JP | 2012-175062 A | 9/2012 |
| KR | 2011-0088735 A | 8/2011 |
| KR | 2012-0129234 A | 11/2012 |
| WO | 01/53919 A2 | 7/2001 |
| WO | 02/17051 A1 | 2/2002 |

OTHER PUBLICATIONS

Office Action dated Feb. 9, 2016, issued in counterpart European Patent Application No. 14 157 516.7. (4 pages).

Office Action dated May 27, 2016, issued in counterpart Chinese Patent Application No. 201410092496.X, with English translation. (14 pages).

Office Action dated Oct. 4, 2016, issued in counterpart Japanese Patent Application No. 2013-067665, with English translation. (9 pages).

* cited by examiner

ELECTRONIC DEVICE

CROSS-REFERENCE TO RELATED APPLICATION

This application is based upon and claims the benefit of priority from the prior Japanese Patent Application No. 2013-067665 filed on Mar. 27, 2013, the entire contents of which are incorporated herein by reference.

FIELD

The embodiment discussed herein relates to an electronic device.

BACKGROUND

Portable electronic devices typified by cell telephones and tablet computers have spread rapidly in recent years. Among such electronic devices, there are also a large number of electronic devices that employ folding structures for reasons such as compactness.

An example of a conventional folding structure for an electronic device is a structure that has a single-axis hinge between two casings, in which the two casings open and close by using the hinge rotating.

Furthermore, in order to improve durability, there is a conventional technology which has a structure that uses a hinge having two parallel axes. In addition, there is a conventional technology in which a plurality of gears are arranged between two casings to control the opening and closing of the casings. These technologies are disclosed in, for example, Japanese Laid-open Patent Publication No. 2006-228812 and Japanese Laid-open Patent Publication No. 2010-250463.

SUMMARY

According to an aspect of the invention, an electronic device includes a first casing rotatably supported by a first rotation axis, a second casing rotatably supported by a second rotation axis that is parallel to the first rotation axis, a first cam that is provided on the first rotation axis, rotates about the first rotation axis in accordance with rotation of the first casing, and causes the first casing to move together with the first rotation axis in a direction away from the second rotation axis, a second cam that is provided on the second rotation axis, rotates about the second rotation axis in accordance with rotation of the second casing, and causes the second casing to move together with the second rotation axis in a direction away from the first rotation axis, and an elastic member that applies a force in a direction in which the first rotation axis and the second rotation axis become closer.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

If a structure is adopted in which a single-axis hinge is employed and two casings are opened to 180 degrees, problems such as the following are conceivable. First, there are instances where, in a state in which the two casings have been completely opened, the portion in which the hinge is accommodated protrudes with respect to the opened casing surfaces. If the housing section for the hinge protrudes between the casings in this manner, the space (clearance) between the casings increases by an amount equal to the housing section for the hinge. Therefore, for example, in instances such as when each of the casings has a screen, the space between the two screens greatly increases, and it is not possible to obtain a sense of unity between the two screens.

Furthermore, there are instances where, in the state in which the two casings have been completely opened, a level difference occurs between one casing and the other casing. If there is a level difference between the casings in this manner, the space between the casings is large due to the level reference. In this instance also, if screens are provided in the casings for example, both screens are not flush and the space widens, and, as expected, it is not possible to obtain a sense of unity between the screens when both screens are used.

Furthermore, even if the conventional technology that employs a hinge simply having two parallel axes is used, there is a risk of the space between the casings further increasing compared to the single-axis hinge structure, by an amount equivalent to that desired to employ two axes, and it is difficult to narrow the space between the casings. Furthermore, even if the conventional technology that uses gears is used, the space between the portions in which the gears are arranged increases, and it is difficult to narrow the space between the casings. Therefore, if screens are provided in the casings for example, it is not possible to obtain a sense of unity between the screens regardless of which conventional technology is used.

An embodiment of an electronic device disclosed in the present application is described in detail hereafter on the basis of the drawings. It ought to be noted that the electronic device disclosed in the present application is not restricted by the following embodiment.

EMBODIMENT

Figure 1A:
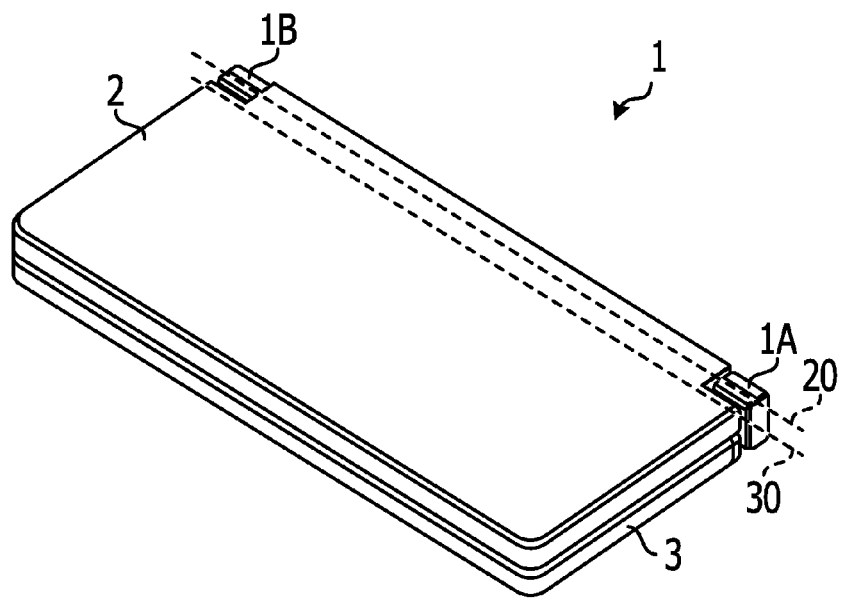
FIG. 1A is a schematic perspective view depicting the closed state of an electronic device according to an embodiment.
Figure 1B:
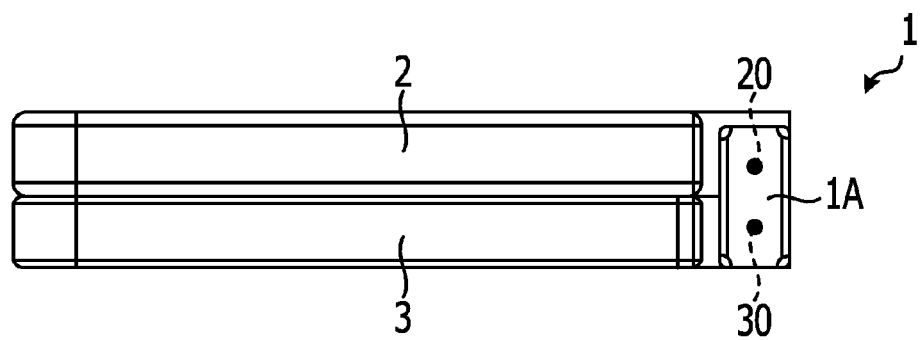
FIG. 1B is a schematic side view depicting the closed state of an electronic device according to an embodiment.
Figure 2A:
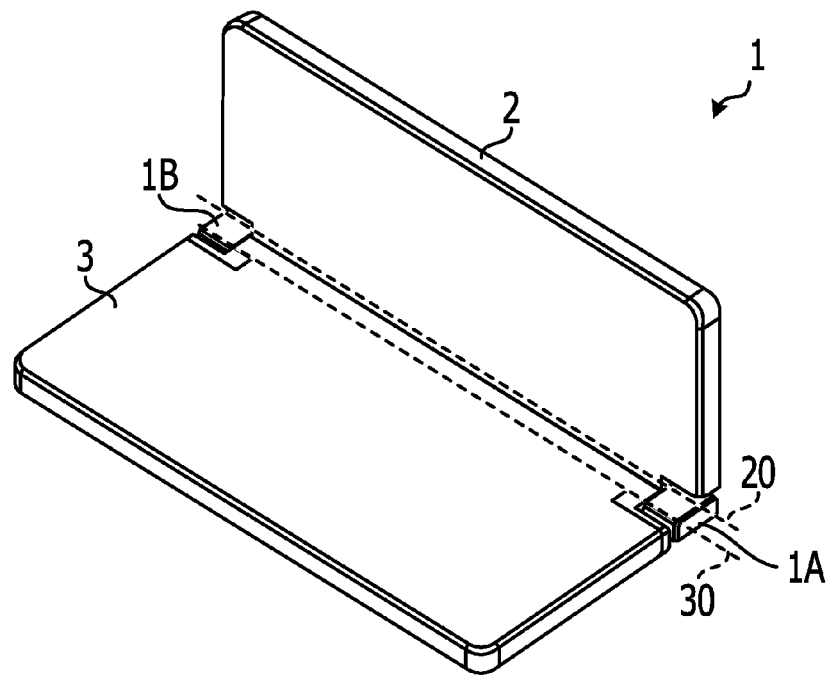
FIG. 2A is a schematic perspective view depicting the mid-opened/closed state of an electronic device according to an embodiment.
Figure 2B:
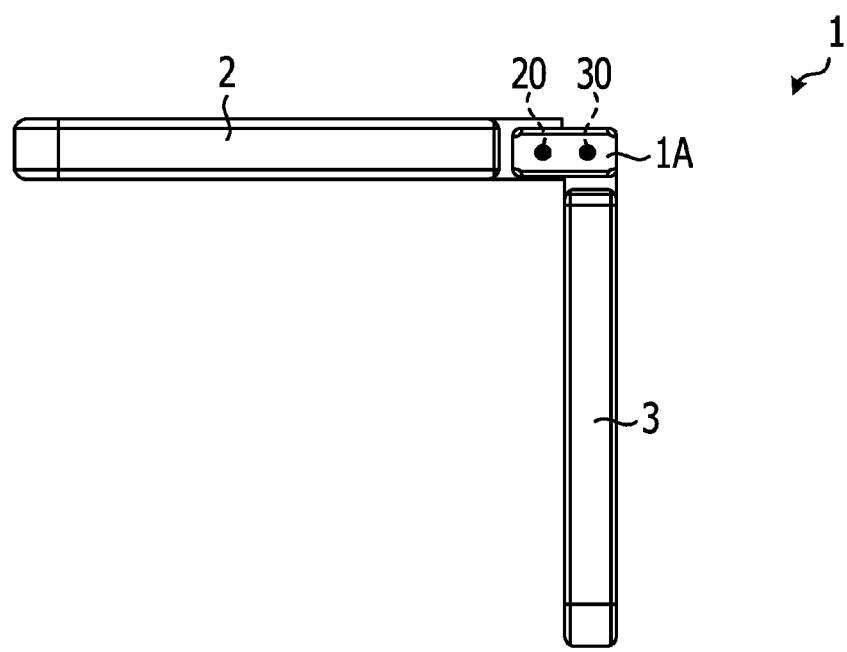
FIG. 2B is a schematic side view depicting the mid-opened/closed state of an electronic device according to an embodiment.
Figure 3A:
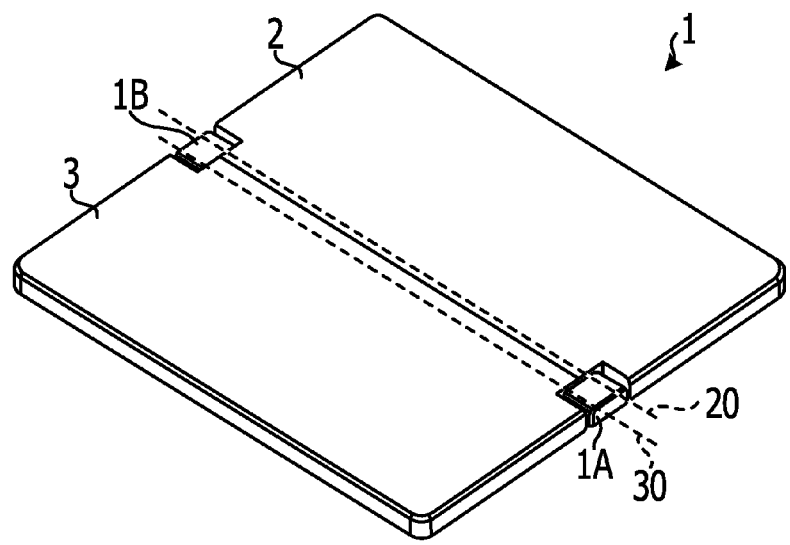
FIG. 3A is a schematic perspective view depicting the opened state of an electronic device according to an embodiment.
Figure 3B:
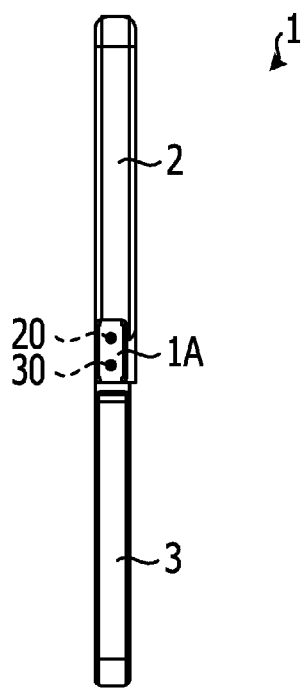
FIG. 3B is a schematic side view depicting the opened state of an electronic device according to an embodiment.

FIG. 1A is a schematic perspective view depicting the closed state of an electronic device according to the embodiment. FIG. 1B is a schematic side view depicting the closed state of an electronic device according to the embodiment. FIG. 2A is a schematic perspective view depicting the mid-opened/closed state of an electronic device according to the embodiment. FIG. 2B is a schematic side view depicting the mid-opened/closed state of an electronic device according to the embodiment. FIG. 3A is a schematic perspective view depicting the opened state of an electronic device according to the embodiment. FIG. 3B is a schematic side view depicting the opened state of an electronic device according to the embodiment.

As depicted in FIG. 1A to FIG. 3B, an electronic device 1 according to the present embodiment has an upper casing 2 and a lower casing 3. The upper casing 2 and the lower casing 3 are linked by hinges 1A and 1B. The upper casing 2 is an example of a "first casing". Furthermore, the lower casing 3 is an example of a "second casing".

The dashed lines in FIG. 1A, FIG. 2A, and FIG. 3A, and the dots in FIG. 1B, FIG. 2B, and FIG. 3B represent the rotation axis 20 of the upper casing 2 and the rotation axis 30 of the lower casing 3.

The upper casing 2 is rotatably supported about the rotation axis 20 by the hinges 1A and 1B. In other words, as depicted in FIG. 1A to FIG. 3B, the upper casing 2 turns about the rotation axis 20. Furthermore, the lower casing 3 is rotatably supported about the rotation axis 30 by the hinges 1A and 1B. In other words, as depicted in FIG. 1A to FIG. 3B, the lower casing 3 turns about the rotation axis 30.

As depicted in FIG. 1A and FIG. 1B, mutual surfaces of the upper casing 2 and the lower casing 3 come into contact with each other. This state is hereafter referred to as the closed state of the electronic device 1. The surfaces of the upper casing 2 and the lower casing 3 that come into contact with each other in the closed state of the electronic device 1 are referred to as the contact surfaces of each of the upper casing 2 and the lower casing 3. Furthermore, the angle formed by the upper casing 2 and the lower casing 3 at this time is 0 degrees.

Furthermore, as depicted in FIG. 3A and FIG. 3B, the upper casing 2 and the lower casing 3 rotate to a position where the mutual contact surfaces form the same one surface, in other words a position where the mutual contact surfaces are flush. This state is hereafter referred to as the completely opened state of the electronic device 1. Furthermore, the angle formed by the upper casing 2 and the lower casing 3 at this time is 180 degrees.

In addition, the state during the transition from the closed state of the electronic device 1 to the completely opened state, in other words the mid-open/close operation state, is represented using the angle formed by the upper casing 2 and the lower casing 3. For example, the state in FIG. 2A and FIG. 2B is a state in which the electronic device 1 has been opened to 90 degrees.

Figure 4:
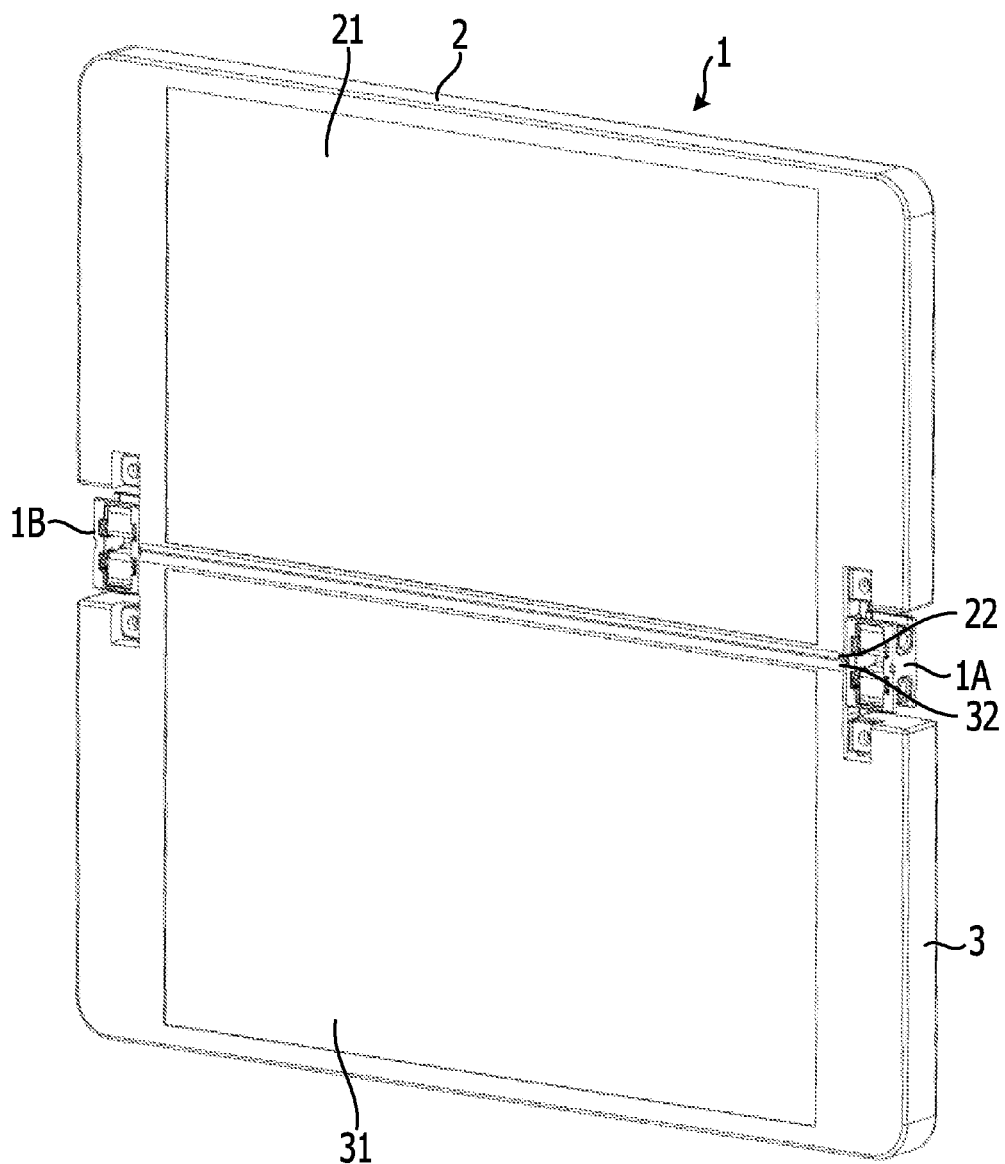
FIG. 4 is a perspective view depicting a specific example of an electronic device.

FIG. 4 is a perspective view depicting a detailed example of the electronic device. FIG. 4 is the completely opened state of the electronic device 1. In FIG. 4, the configurations of the hinge 1A and the hinge 1B are illustrated in more detail.

For example, as depicted in FIG. 4, in the upper casing 2 and the lower casing 3 of the electronic device 1, a screen 21 and a screen 31 may be arranged on the surfaces of the sides that come into contact in the closed state of the electronic device 1. In such instances, in the electronic device 1 according to the present embodiment, in the completely opened state, the screen 21 and the screen 31 are arranged side-by-side so as to form the same one surface. Thus, it is possible to obtain a sense of unity between the screens when the screen 21 and the screen 31 are used as a single screen.

Furthermore, although FIG. 4 depicts a state in which the hinge 1A and the hinge 1B are exposed, the hinge 1A and the hinge 1B may be covered by a cover, for example. By covering the hinge 1A and the hinge 1B with a cover, it is possible to improve the external appearance of the electronic device 1, and to protect the hinge 1A and the hinge 1B.

Furthermore, in FIG. 4, the edge section 22 represents the edge section of the lower casing 3 side of the surface of the upper casing 2 that has the screen 21. In addition, in FIG. 4, the edge section 32 represents the edge section of the upper casing 2 side of the surface of the lower casing 3 that has the screen 31. The edge section 22 is an example of a "first edge section". Furthermore, the edge section 32 is an example of a "second edge section".

Figure 5:
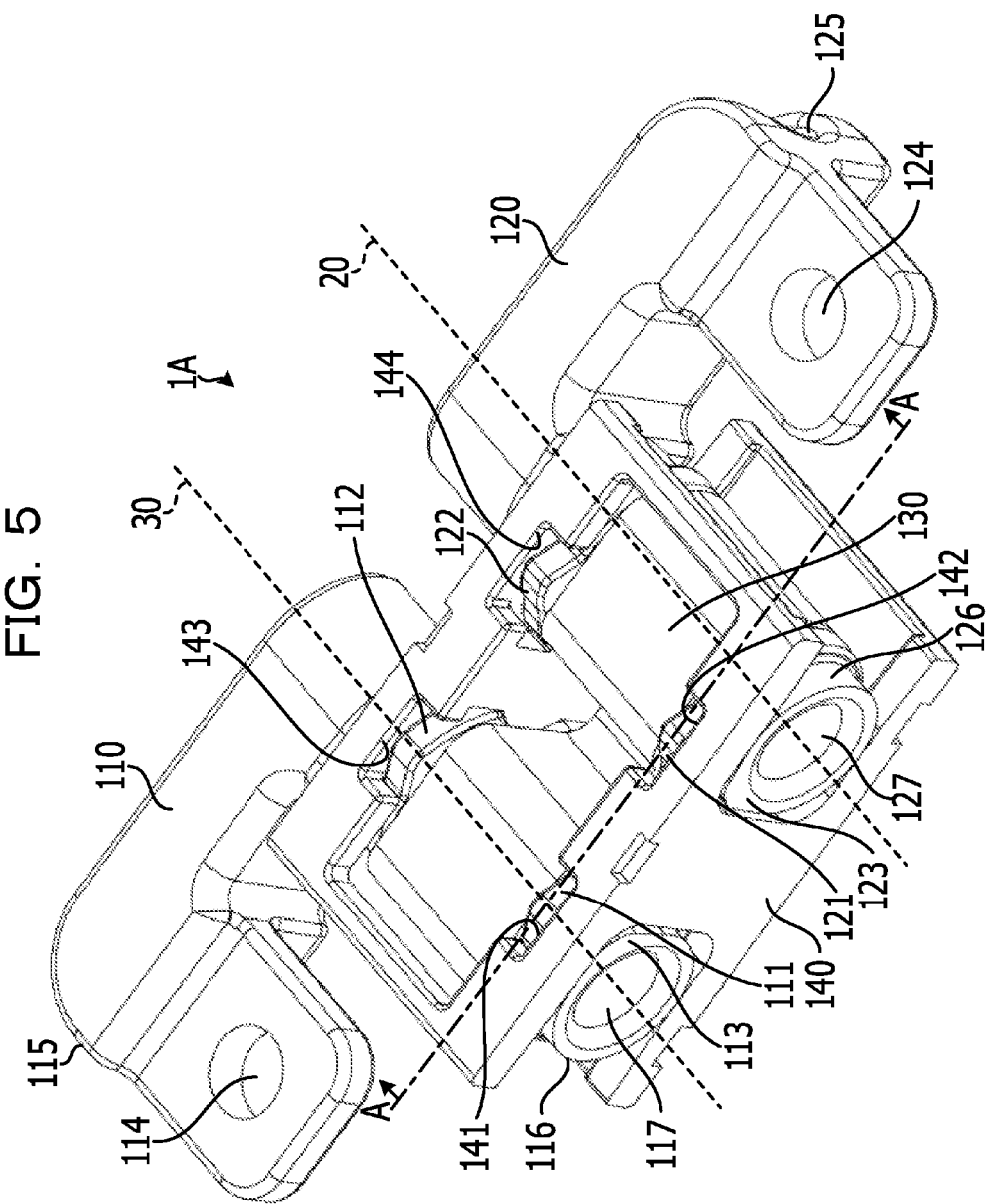
FIG. 5 is a perspective view of a hinge.
Figure 6:
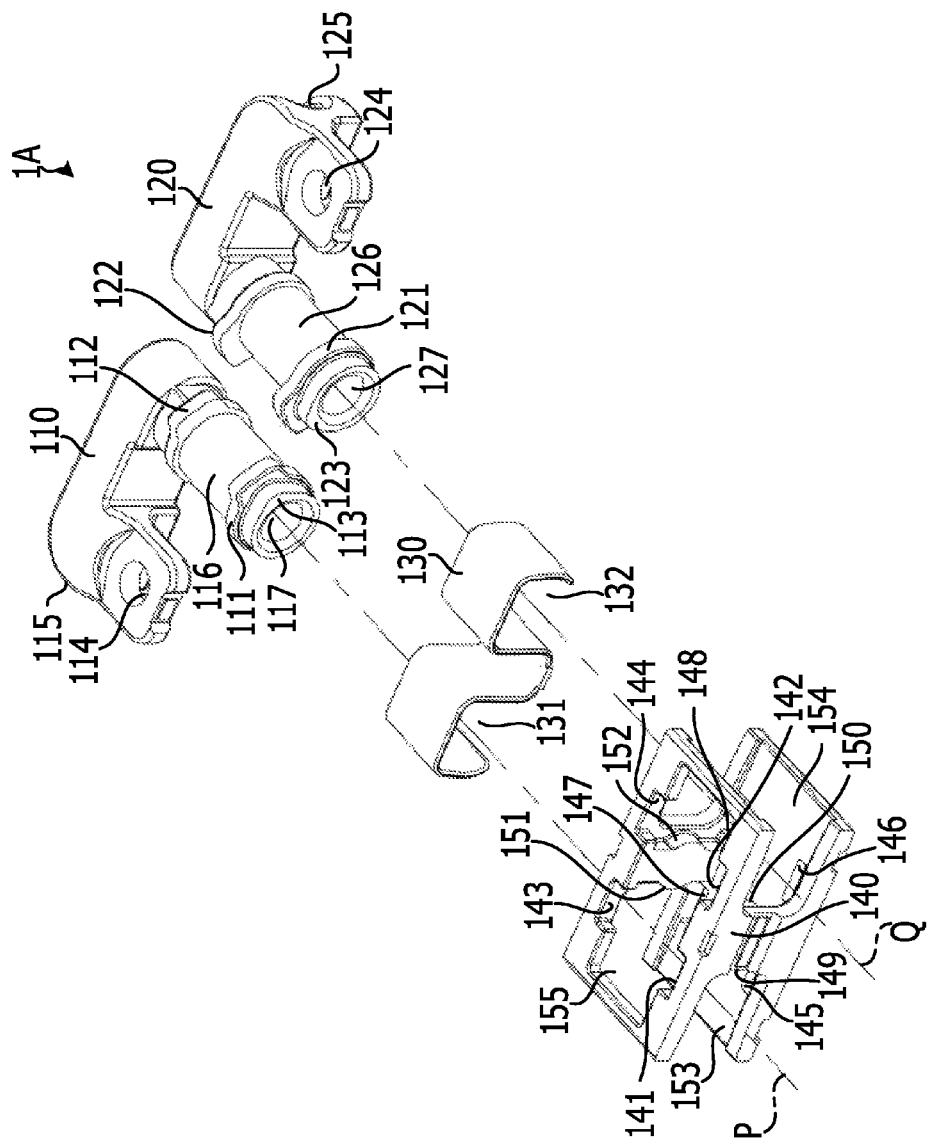
FIG. 6 is an exploded perspective view of a hinge.

Next, the configurations of the hinges 1A and 1B are described. Here, the hinge 1A and the hinge 1B have the same configuration except that the directions in which the cams described hereafter are attached with respect to the rotation axis 20 and the rotation axis 30 are reversed. An example of the hinge 1A is therefore described hereafter. FIG. 5 is a perspective view of the hinge. FIG. 5 depicts the hinge in a state in which the hinge 1A in the state in FIG. 4 has been removed from the upper casing 2 and the lower casing 3. Furthermore, FIG. 6 is an exploded perspective view of the hinge. FIG. 6 depicts a state in which the hinge 1A of the state in FIG. 5 has been disassembled.

As depicted in FIG. 5 and FIG. 6, the hinge 1A has a linking member 110, a linking member 120, an M-shaped spring 130, and a housing 140.

The linking member 110 has a cam 111, a cam 112, a stopper 113, a connection hole 114, a groove 115, and a cylindrical member 116. The groove 115 has the same structure as a groove 125 described hereafter; however, the groove 115 is not depicted due to being positioned at the far side in FIG. 5.

The linking member 110 is fixed to the lower casing 3 by using the connection hole 114. For example, the linking member 110 is attached to the lower casing 3 by a bolt or the like being inserted through the connection hole 114 and fixed to the lower casing 3. Moreover, the linking member 120 is similarly fixed to the upper casing 2 by using a connection hole 124.

The cylindrical member 116 is hollow and has a hole 117. The central axis of the cylindrical member 116 is aligned with the rotation axis 30 when the linking member 110 is attached to the lower casing 3 by way of the connection hole 114.

The cam 111 and the cam 112 are plate cams. The cam 111 and the cam 112 are arranged surrounding the cylindrical member 116. For example, the cam 111 and the cam 112 have through holes provided such that the centers are aligned with the central axis of the cylindrical member 116 and the rotation axis 30, and the cylindrical member 116 is inserted through the through holes as a camshaft so that the cam 111 and the cam 112 are fixed in predetermined positions of the cylindrical member 116. Alternatively, for example, the cam 111 and the cam 112 may be integrally formed with the cylindrical member 116 so as to be positioned in the predetermined positions of the cylindrical member 116. The cam crests of the cam 111 and the cam 112 extend in a direction orthogonal to the central axis of the cylindrical member 116. Furthermore, in a state in which the linking member 110 is attached to the lower casing 3, the cam 111 is arranged in a position further away from the lower casing 3 than the cam 112 along the rotation axis 30.

Figure 7:
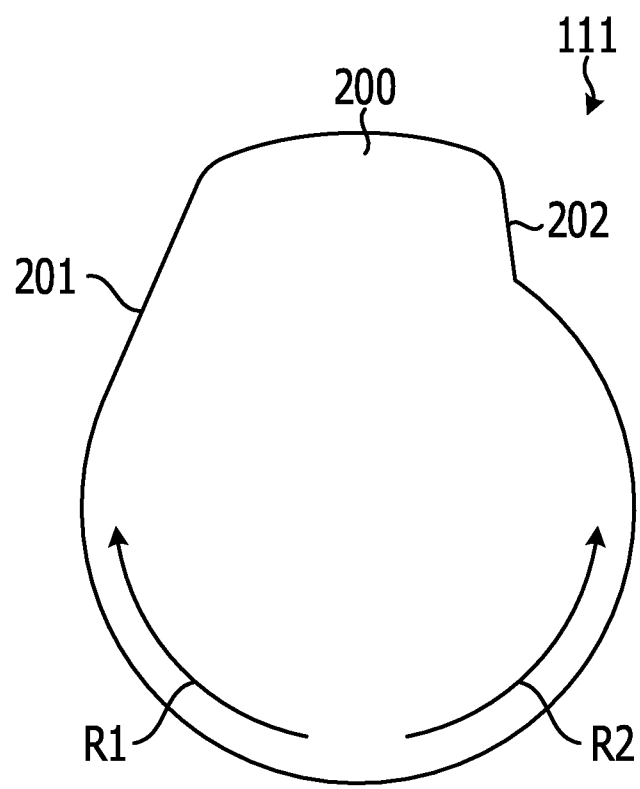
FIG. 7 is a schematic diagram for illustrating the shape of a cam.

Here, the details of the shape of the cam 111 are described with reference to FIG. 7. FIG. 7 is a schematic diagram for illustrating the cam shape. FIG. 7 is a view of the plate-shaped cam 111 having been placed flat on a surface. As depicted in FIG. 7, in the cam crest 200 of the cam 111, the inclination angle of one inclined section 201 is smaller than the inclination angle of the other inclined section 202.

When the cam 111 rotates in the rotation direction R1, the cam crest 200 rides up a cam receiver 149 from the inclined section 202 side. In this instance, because the inclination angle of the inclined section 202 is large compared to the inclined section 201, a large force is desired for the rotation of the cam 111 in order for the cam crest 200 to ride up the cam receiver 149. In other words, the torque desired for the rotation of the cam 111 is large. The torque desired for the rotation is hereafter referred to as "load torque".

On the other hand, when the cam 111 rotates in the rotation direction R2, the cam crest 200 rides up the cam receiver 149 from the inclined section 201 side. In this instance, because the inclination angle of the inclined section 201 is small compared to the inclined section 202, the force desired for the rotation of the cam 111 in order for the cam crest 200 to ride up the cam receiver 149 is small compared to rotation in the rotation direction R1. In other words, the load torque of the cam 111 is small.

In this way, in the cam 111, the angles of inclination of both inclined surfaces of the cam crest 200 are differed, and the load torques according to the rotation direction are thereby differed. Although the cam 111 is described here, the angles of inclination of both inclined surfaces of the cam crests are likewise different for the cam 112, a cam 121, and a cam 122.

In the electronic device 1 according to the present embodiment, for example, when the upper casing 2 and the lower casing 3 are closed, load torque is applied to the cams of the hinge 1A such that the lower casing 3 rotates before the upper casing 2. Furthermore, when the upper casing 2 and the lower casing 3 are opened, load torque is applied to the cams of the hinge 1A such that the upper casing 2 rotates before the lower casing 3.

To be specific, because the cam 111 and the cam 112 are cams of the linking member 110 which is fixed to the lower casing 3, the inclination angles of the inclined sections of the cam crests at the sides that ride up when the upper casing 2 and the lower casing 3 are opened are large. Furthermore, in the cam 111 and the cam 112, the inclination angles of the inclined sections of the cam crests at the sides that ride up when the upper casing 2 and the lower casing 3 are closed are small.

In other words, when viewed from a surface side that includes the thickness direction of the electronic device 1, the cam 111 and the cam 112 have the shape depicted in FIG. 7. Conversely, when viewed from a surface side that includes the thickness direction of the electronic device 1, the cams of the linking member at the lower casing 3 side of the hinge 1B have a shape in which the inclination of the inclined sections is the reverse of that in FIG. 7, in other words a shape in which left and right in FIG. 7 are reversed. Furthermore, when viewed from a surface side that includes the thickness direction of the electronic device 1, the cam 121 and the cam 122 have the shape depicted in FIG. 7. Conversely, when viewed from a surface side that includes the thickness direction of the electronic device 1, the cams of the linking member at the upper casing 2 side of the hinge 1B have a shape in which the inclination of the inclined sections is the reverse of that in FIG. 7, in other words a shape in which the left and right in FIG. 7 are reversed.

In addition, the cam crest of the cam 111 (the cam crest 200 in FIG. 7) is described with reference to FIG. 4 and FIG. 5. The cross section in which the cam crest 200 of the cam 111 is orthogonal to the rotation axis 30 is described. The cam crest 200 of the cam 111 protrudes in the direction of the edge section 32 in FIG. 4. In other words, the cam crest 200 of the cam 111 is arranged such that, when the line joining the rotation axis 30, the edge section 32 of the lower casing 3, and the rotation axis 20 forms one straight line due to the linking member 110 rotating about the rotation axis 30, the apex of the cam crest is positioned on that straight line. This state is the state in which the upper casing 2 and the lower casing 3 have been opened 45 degrees. In other words, the cam 111 is formed such that, in the state in which the upper casing 2 and the lower casing 3 have been opened 45 degrees, the apex of the cam crest 200 is positioned on the cam receiver 149. The reason that the cam crest 200 of the cam 111 is arranged so as to protrude in the direction of the edge section 32 is because, when the lower casing 3 rotates, the edge section 32 approaches the upper casing 2 to the closest extent on the basis of the rotation axis 30.

In this way, the cam crest 200 of the cam 111 is formed such that, when the line joining the rotation axis 30, the edge section 32, and the rotation axis 20 forms a straight line, the rotation axis 30 which is the central axis of the cylindrical member 116 and the rotation axis 20 which is the central axis of a cylindrical member 126 are farthest away from each other. For example, the cam crest 200 of the cam 111 has a height such that, in the state in which the upper casing 2 and the lower casing 3 have been opened 45 degrees, the distance between the rotation axis 20 and the rotation axis 30 increases to equal to or greater than the length obtained by totaling the distance from the rotation axis 20 to the screen 21 (refer to FIG. 4) of the upper casing 2 and the distance from the rotation axis 30 to the edge section 32.

Furthermore, although the cam 111 has been described here as an example, the cam 112 also has the same shape as the cam 111. Furthermore, in the cam 121 and the cam 122, the cam crests of the cam 121 and the cam 122 are arranged such that, when the line joining the rotation axis 20, the edge section 22 (refer to FIG. 4) of the upper casing 2, and the rotation axis 30 forms one straight line, the central axis of the cylindrical member 116 and the central axis of the cylindrical member 126 are farthest away from each other.

This state is the state in which the upper casing 2 and the lower casing 3 have been opened 135 degrees. The cam 121 and the cam 122 are also the same as the cam 111 with respect to the rest of the structure other than the cam crest. The cam 111 and the cam 112 are examples of a "first cam". Furthermore, the cam 121 and the cam 122 are examples of a "second cam".

As depicted in FIG. 5, the stopper 113 is formed by part of the end section of the cylindrical member 116 that is at the far side from the lower casing 3 in the electronic device 1 protruding in a direction orthogonal to the central axis of the cylindrical member 116. The stopper 113 is arranged in a position closer to the lower casing 3 than the cam 111 along the rotation axis 30.

Furthermore, the groove 115 is provided in the surface facing the lower casing 3 side of the linking member 110. The groove 115 links with the internal space of the lower casing 3 when the linking member 110 is attached to the lower casing 3 by way of the connection hole 114. In addition, the groove 115 is linked with the hole 117. Thus, a cable that extends from a member arranged in the internal space of the lower casing 3 extends outside by way of the groove 115 and the hole 117 of the linking member 110. The cable that extends outside from the hole 117 is able to connect to a member arranged in the internal space of the upper casing 2 by way of a hole 127 and the groove 125 of the linking member 120. Thus, it is possible to connect the member arranged in the internal space of the lower casing 3 and the member arranged in the internal space of the upper casing 2.

As depicted in FIG. 6, the housing 140 has a H-shaped longitudinal cross section that has a recess section 153 and a recess section 154. The linking member 110 is accommodated in the housing 140 along the dashed line P, and is fitted into the recess section 153 of the housing 140. Furthermore, the linking member 120 is accommodated in the housing 140 along the dashed line Q, and the linking member 120 is fitted into the recess section 154 of the housing 140. As depicted in FIG. 5, the linking member 110 is stored in the recess section 153, and the linking member 120 is accommodated in the recess section 154. The housing 140 having the recess section 153 and the recess section 154 is open in the directions in which the central axis of the cylindrical member 116 that is the rotation axis 30 of the lower casing 3, and the central axis of the cylindrical member 126 that is the rotation axis 20 of the upper casing 2 move away from each other.

In addition, in the present embodiment, the housing 140 has cam relief sections 141 to 148 in order to reduce size. With regard to the cam 111, the cam crest is received in the cam relief section 141 when the linking member 110 rotates in the direction in which the lower casing 3 opens. Furthermore, with regard to the cam 112, the cam crest is received in the cam relief section 143 when the linking member 110 rotates in the direction in which the lower casing 3 opens. With regard to the cam 111, the cam crest is received in the cam relief section 145 when the linking member 110 rotates in the direction in which the lower casing 3 closes. Furthermore, with regard to the cam 112, the cam crest is received in the cam relief section 147 when the linking member 110 rotates in the direction in which the lower casing 3 closes.

Similarly, with regard to the cam 121, the cam crest is received in the cam relief section 142 when the linking member 120 rotates in the direction in which the upper casing 2 opens. Furthermore, with regard to the cam 122, the cam crest is received in the cam relief section 144 when the linking member 120 rotates in the direction in which the upper casing 2 opens. With regard to the cam 121, the cam crest is received in the cam relief section 146 when the linking member 120 rotates in the direction in which the upper casing 2 closes. Furthermore, with regard to the cam 122, the cam crest is received in the cam relief section 148 when the linking member 120 rotates in the direction in which the upper casing 2 closes.

For example, FIG. 5 depicts a state in which the cam crest of the cam 111 is received in the cam relief section 141, and the cam crest of the cam 112 is received in the cam relief section 143. In addition, FIG. 5 depicts a state in which the cam crest of the cam 121 is received in the cam relief section 142, and the cam crest of the cam 122 is received in the cam relief section 144.

For example, if the cam 111, the cam 112, the cam 121, and the cam 122 after rotation were stored inside the housing 140, the housing 140 would have a size that is one size larger than the cams. In contrast, as in the present embodiment, by employing a structure in which after rotation the cam 111, the cam 112, the cam 121, and the cam 122 are stored protruding from the internal space of the housing 140, the size of the housing 140 is approximately the same size as the cams. Thus, it is possible for the housing 140 to be made compact.

Furthermore, as depicted in FIG. 6, the housing 140 has cam receivers 149 to 152. The cam receiver 149 comes into contact with the cam 111 that rotates, receives a force from the cam 111, and the central axis of the cylindrical member 116 is made to move in the direction away from the central axis of the cylindrical member 126. In other words, the rotation axis 30 moves in the direction away from the rotation axis 20 due to the force from the cam receiver 149. In the present embodiment, the cam receiver 149 has a cam crest that protrudes from the central axis of the cylindrical member 126 toward the central axis of the cylindrical member 116. Thus, it is possible for the central axis of the cylindrical member 116 to be moved away from the central axis of the cylindrical member 126 to a considerable extent when the cam crests of the cams are positioned on the line joining the central axis of the cylindrical member 126 and the central axis of the cylindrical member 116.

The cam receiver 150 is a cam receiver that corresponds to the cam 112. The cam receiver 150 also causes the central axis of the cylindrical member 126 to move in the direction away from the central axis of the cylindrical member 116. The cam receiver 151 is a cam receiver that corresponds to the cam 121. The cam receiver 152 is a cam receiver that corresponds to the cam 122. The cam receiver 151 and the cam receiver 152 also cause the central axis of the cylindrical member 126 to move in the direction away from the central axis of the cylindrical member 116.

In addition, the housing 140 has an opening 155 for contact to be made from outside of the housing 140 with the cylindrical member 116 and the cylindrical member 126 stored in the recess section 153 and the recess section 154. The opening 155 is provided in the surface of the housing 140 that is parallel with a plane that joins the central axis of the cylindrical member 116 and the central axis of the cylindrical member 126.

As depicted in FIG. 6, the M-shaped spring 130 is a spring that has an M character-type shape having a bent section 131 and a bent section 132. As depicted in FIG. 5, the M-shaped spring 130 is inserted from the opening 155 of the housing 140. In the M-shaped spring 130, the cylindrical member 116 that is accommodated in the recess section 153 is accommodated in the bent section 131. Furthermore, in the M-shaped spring 130, the cylindrical member 126 that is accommodated in the recess section 154 of the housing 140 is accommodated in the bent section 132. When the distance between the central axis of the cylindrical member 126 and the central axis of the cylindrical member 116 increases due to a separation force caused by the action of the cam crests of the rotated cams, the M-shaped spring 130 applies a restoring force to the two cylindrical members in the direction in which the distance is restored.

For example, when the rotation of the linking member 110 finishes and the cam crests of the cam 111 and the cam 112 come away from the cam receiver 149 and the cam receiver 151, the M-shaped spring 130 draws the cylindrical member 116 toward the cylindrical member 126 side in the direction in which the central axis of the cylindrical member 116 and the central axis of the cylindrical member 126 become closer. Furthermore, when the rotation of the linking member 120 finishes and the cam crests of the cam 121 and the cam 122 come away from the cam receiver 150 and the cam receiver 152, the M-shaped spring 130 draws the cylindrical member 126 toward the cylindrical member 116 side in the direction in which the central axis of the cylindrical member 126 and the central axis of the cylindrical member 116 become closer.

Figure 8:
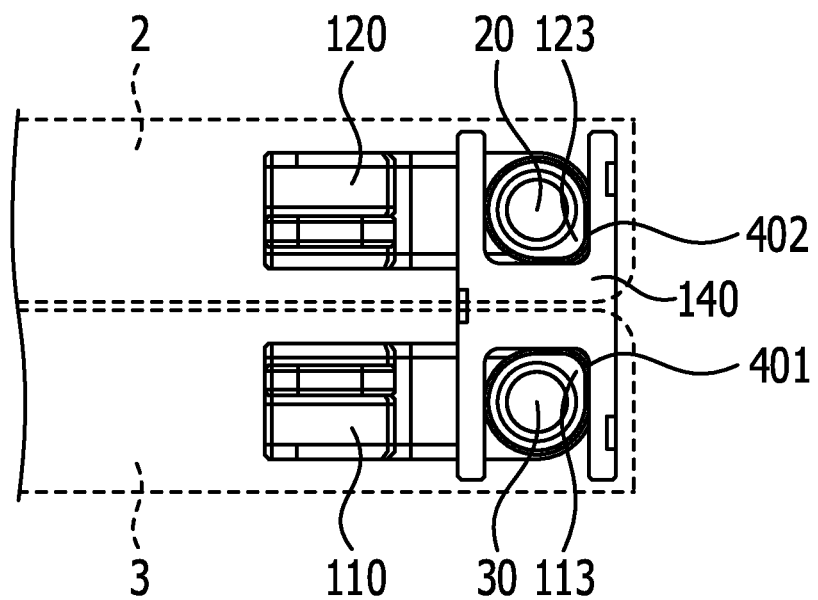
FIG. 8 is a side view in which a linking portion in a closed state has been enlarged.
Figure 9:
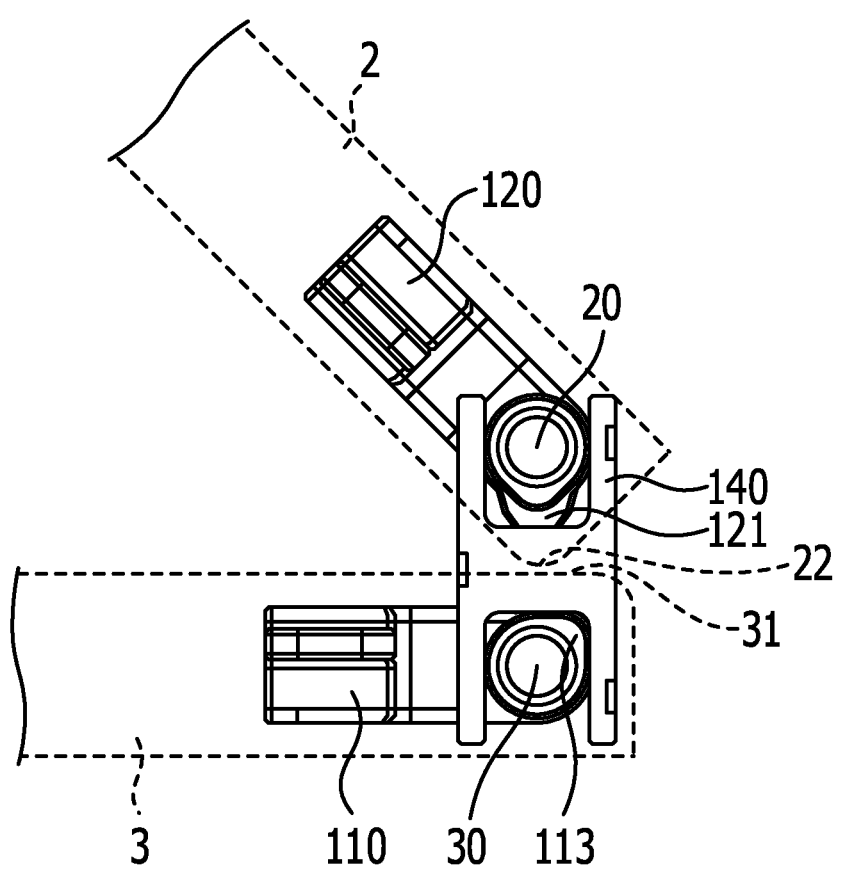
FIG. 9 is a side view in which a linking portion in a 45-degree opened state has been enlarged.
Figure 10:
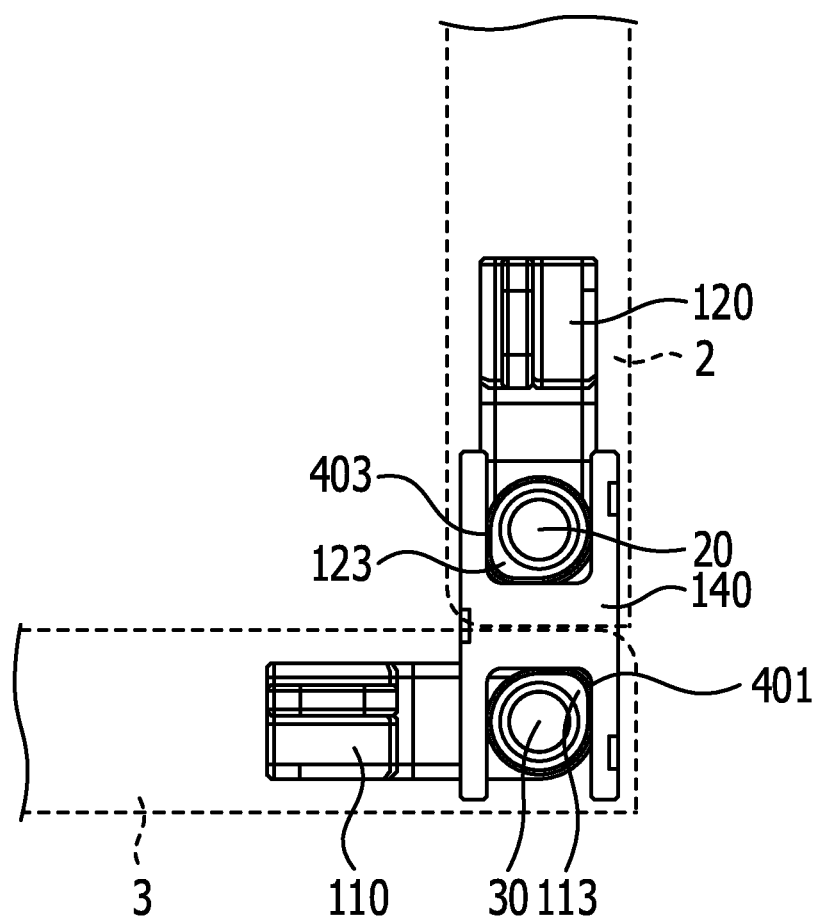
FIG. 10 is a side view in which a linking portion in a 90-degree opened state has been enlarged.
Figure 11:
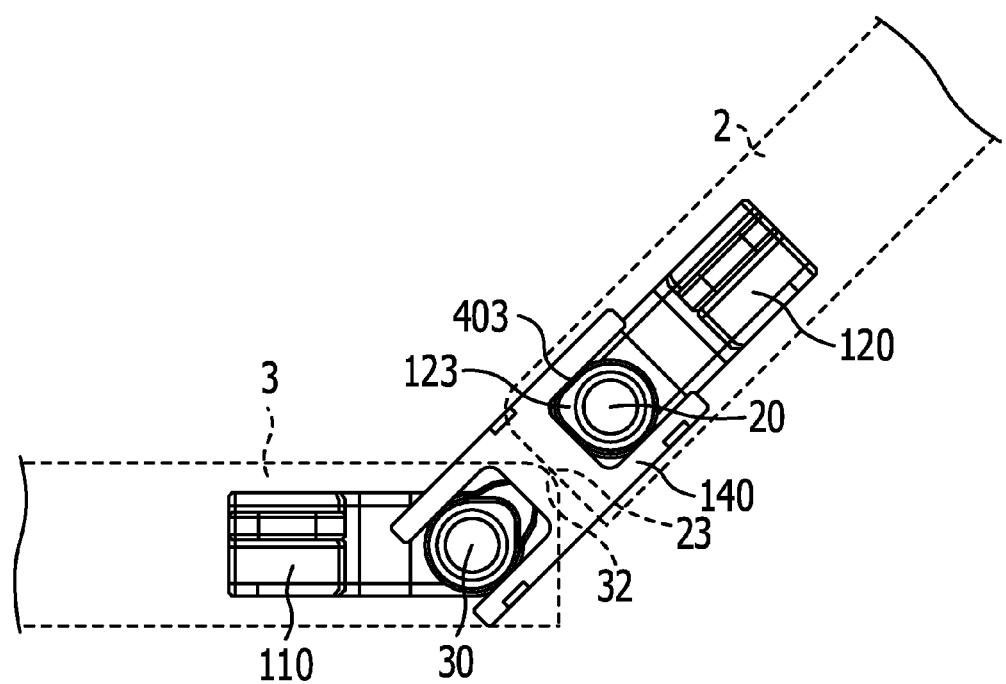
FIG. 11 is a side view in which a linking portion in a 135-degree opened state has been enlarged.
Figure 12:
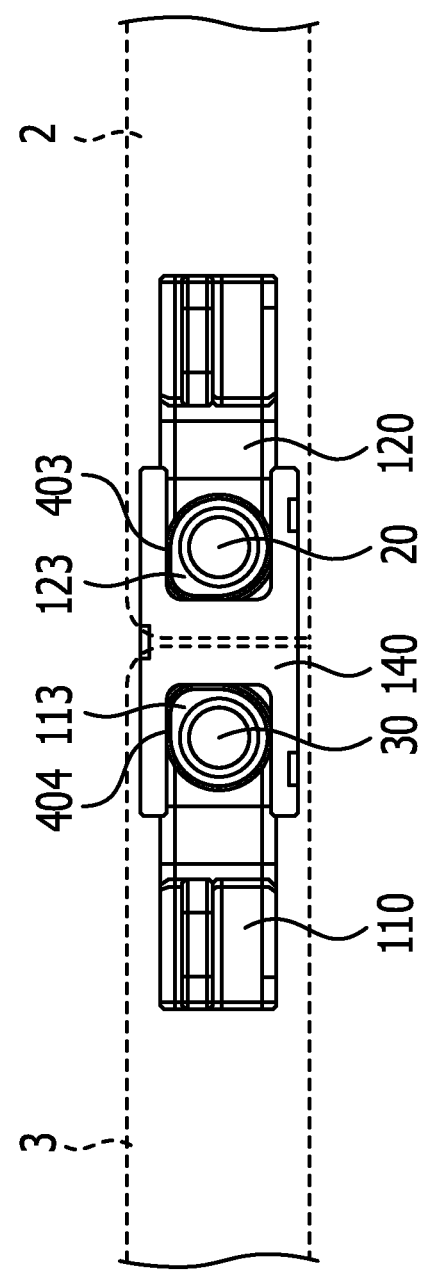
FIG. 12 is a side view in which a linking portion in a 180-degree opened state has been enlarged.

Next, the operation during rotation of the upper casing 2 and the lower casing 3 is described with reference to FIG. 8 to FIG. 12. FIG. 8 is a side view of the linking portion in the closed state. FIG. 9 is a side view of the linking portion in a 45-degree opened state. FIG. 10 is a side view of the linking portion in a 90-degree opened state. FIG. 11 is a side view of the linking portion in a 135-degree opened state. FIG. 12 is a side view of the linking portion in a 180-degree opened state. In FIG. 8 to FIG. 12, the upper casing 2 and the lower casing 3 in each state are represented by dashed lines.

As depicted in FIG. 8, in the state in which the upper casing 2 and the lower casing 3 are closed, the stopper 113 of the linking member 110 abuts a wall 401 of the housing 140. Thus, the linking member 110 is restricted from rotating from this state in the direction approaching the linking member 120. Furthermore, a stopper 123 of the linking member 120 abuts a wall 402 of the housing 140. Thus, the linking member 120 is restricted from rotating from this state in the direction approaching the linking member 110. In this state, when the upper casing 2 and the lower casing 3 are opened, because the load torque of the linking member 110 is larger than the load torque of the linking member 120, first, the linking member 110 does not rotate, and the linking member 120 starts to rotate.

Next, when the linking member 120 further rotates 45 degrees from the state in FIG. 8, the state in FIG. 9 is reached. In the rotation from the state in FIG. 8 to the state in FIG. 9, due to the rotation of the cams 121 and 122, the linking member 120 is made to gradually move in the direction in which the rotation axis 20 of the linking member 120 moves away from the rotation axis 30 of the linking member 110. In the state in FIG. 9, the rotation axis 20 of the linking member 120 and the rotation axis 30 of the linking member 110 are farthest away from each other. Thus, the distance between the upper casing 2 and the lower casing 3 increases, and the linking member 120 rotates without the edge section 22 of the upper casing 2 interfering with the screen 31 of the lower casing 3. When the upper casing 2 and the lower casing 3 are further opened from this state, because the load torque of the linking member 110 is still larger than the load torque of the linking member 120, the linking member 110 does not rotate, and the linking member 120 rotates further.

Next, when the linking member 120 rotates 45 degrees from the state in FIG. 9, the state in FIG. 10 is reached. In the rotation from the state in FIG. 9 to the state in FIG. 10, due to the cams 121 and 122 further rotating and the pressing force produced by the M-shaped spring 130, the linking member 120 is made to move in the direction in which the rotation axis 20 of the linking member 120 approaches the rotation axis 30 of the linking member 110. The distance between the rotation axis 20 of the linking member 120 and the rotation axis 30 of the linking member 110 in the state in FIG. 10 is the same distance as in the closed state. In addition, in the state in FIG. 10, the stopper 123 of the linking member 120 abuts a wall 403 of the housing 140. Thus, the linking member 120 is restricted from rotating from this state in the direction of further opening. When the upper casing 2 and the lower casing 3 are further opened from this state, because the linking member 120 is restricted from rotating, the linking member 110 which has a large load torque starts to rotate.

Next, when the linking member 110 rotates 45 degrees from the state in FIG. 10, the state in FIG. 11 is reached. In the rotation from the state in FIG. 10 to the state in FIG. 11, due to the rotation of the cams 111 and 112, the linking member 110 is made to move in the direction in which the rotation axis 30 of the linking member 110 moves away from the rotation axis 20 of the linking member 120. In the state in FIG. 11, the rotation axis 30 of the linking member 110 and the rotation axis 20 of the linking member 120 are farthest away from each other. Thus, the distance between the upper casing 2 and the lower casing 3 increases, and the linking member 110 rotates without the edge section 32 of the lower casing 3 interfering with the surface 23 of the upper casing 2. When the linking member 110 and the linking member 120 are further opened from this state, because the linking member 120 is restricted from rotating by the stopper 123, the linking member 120 does not rotate, and the linking member 110 rotates.

Next, when the linking member 110 further rotates 45 degrees from the state in FIG. 11, the state in FIG. 12 is reached. In the rotation from the state in FIG. 11 to the state in FIG. 12, due to the cams 111 and 112 rotating and the restoring force produced by the M-shaped spring 130 (not depicted), the linking member 110 is made to gradually move in the direction in which the rotation axis 30 of the linking member 110 approaches the rotation axis 20 of the linking member 120. The distance between the rotation axis 30 of the linking member 110 and the rotation axis 20 of the linking member 120 in the state in FIG. 10 is the same distance as in the closed state. In addition, in the state in FIG. 12, the stopper 113 of the linking member 110 abuts a wall 404 of the housing 140, and the stopper 123 of the linking member 120 abuts the wall 403 of the housing 140. Thus, the linking member 110 and the linking member 120 are restricted from rotating from this state in the direction of further opening. In other words, the upper casing 2 and the lower casing 3 do not open any further.

Figure 13:
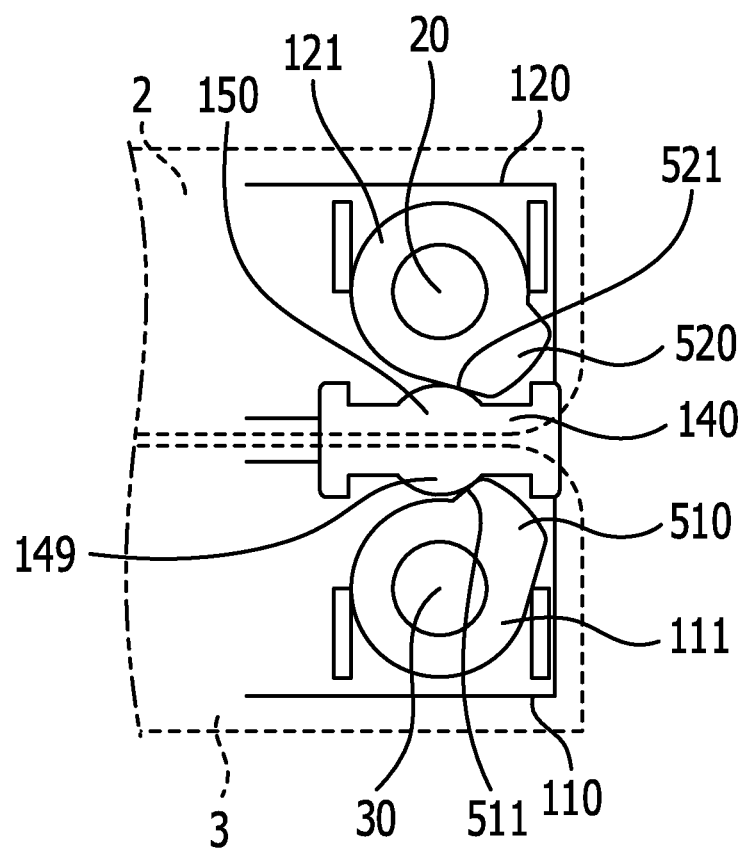
FIG. 13 is a cross-sectional view in which a linking portion in a closed state has been enlarged.
Figure 14:
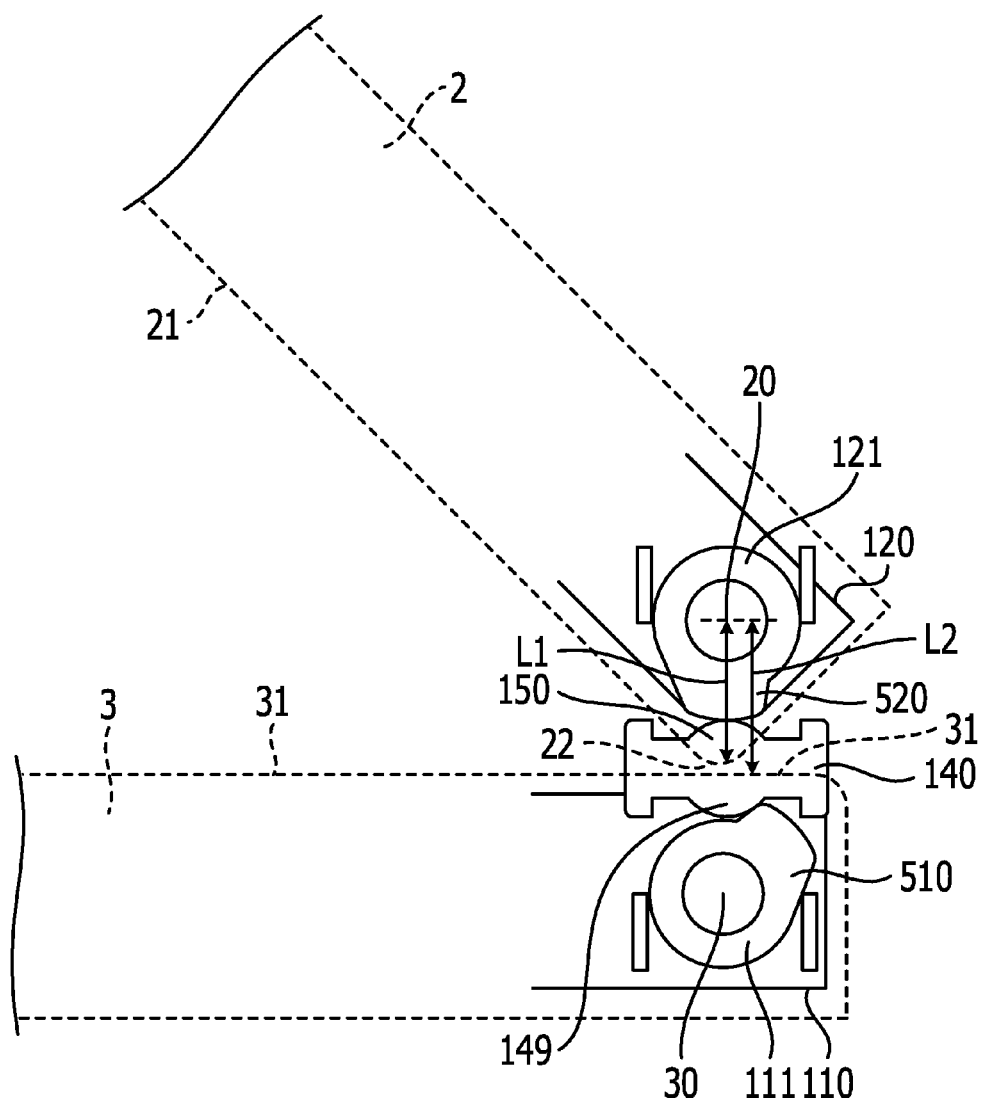
FIG. 14 is a cross-sectional view in which a linking portion in a 45-degree opened state has been enlarged.
Figure 15:
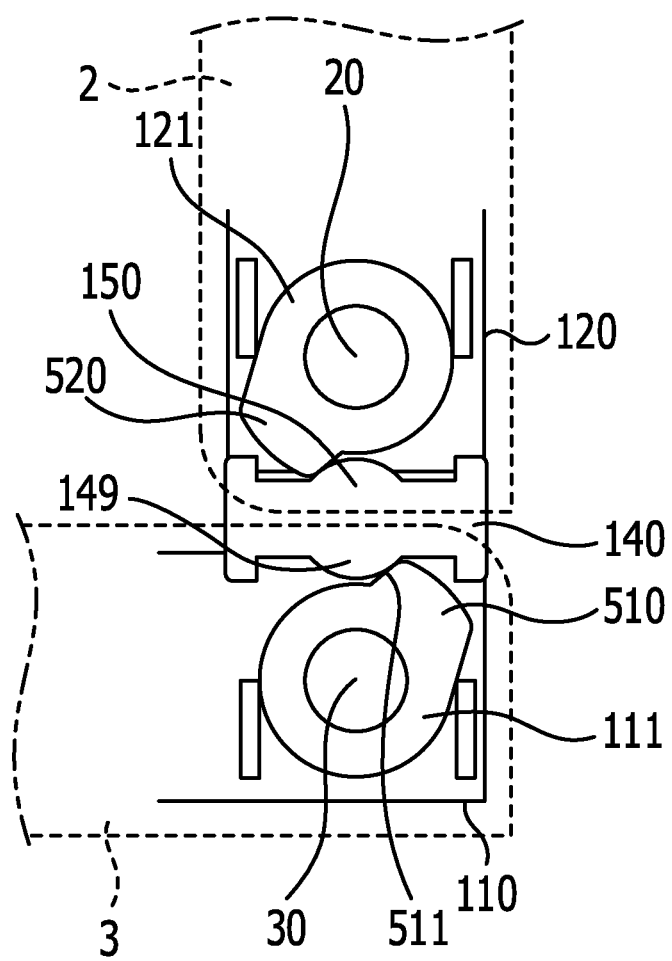
FIG. 15 is a cross-sectional view in which a linking portion in a 90-degree opened state has been enlarged.
Figure 16:
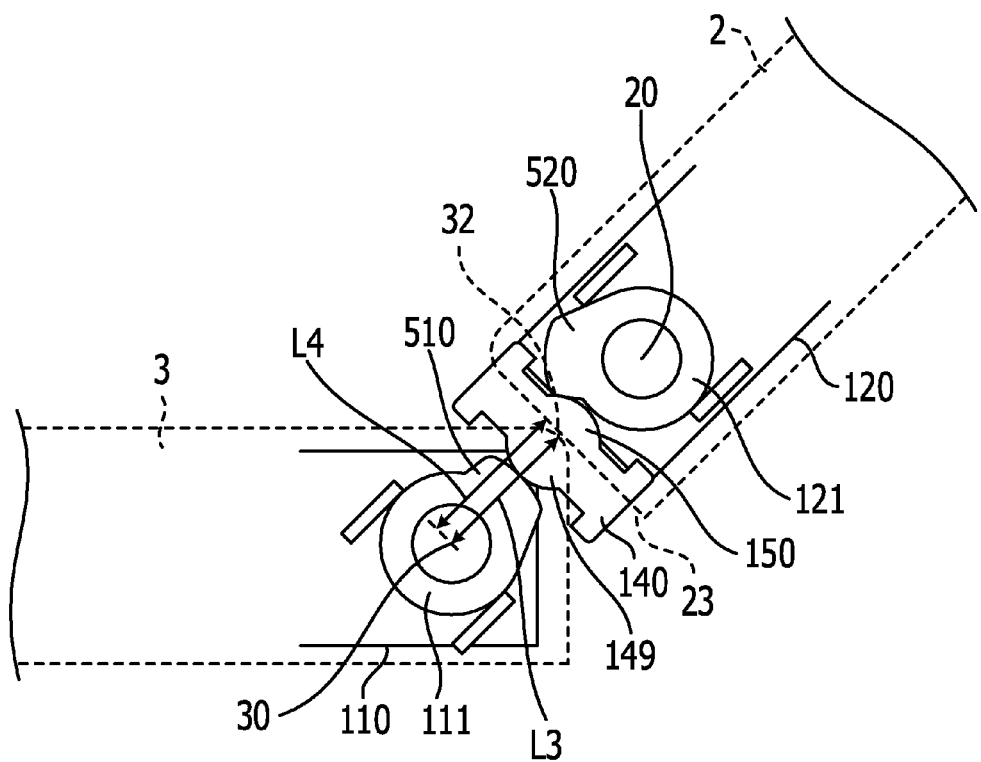
FIG. 16 is a cross-sectional view in which a linking portion in a 135-degree opened state has been enlarged.
Figure 17:
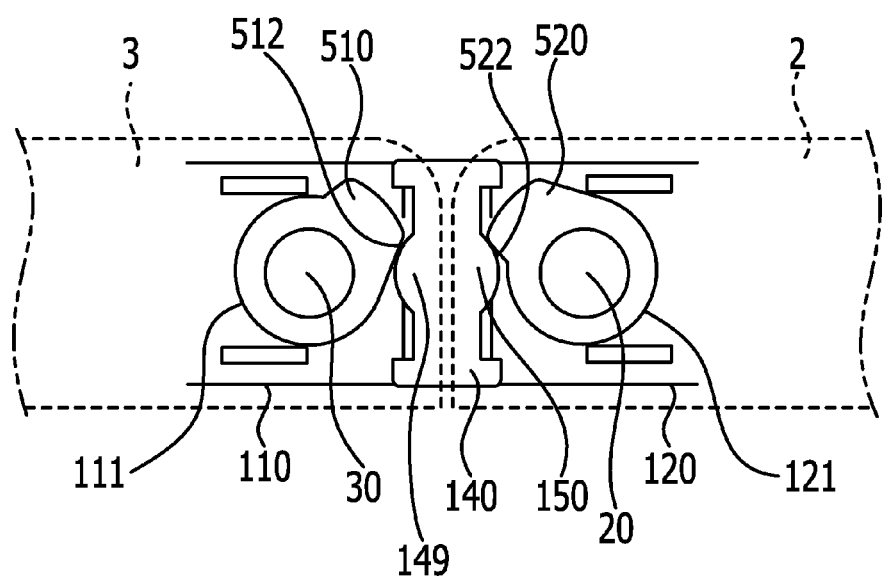
FIG. 17 is a cross-sectional view in which a linking portion in a 180-degree opened state has been enlarged.

Next, the movements of the cams and axes during rotation of the electronic device are explained with reference to FIG. 13 to FIG. 17. FIG. 13 is a cross-sectional view of the linking portion in the closed state. FIG. 14 is a cross-sectional view of the linking portion in a 45-degree opened state. FIG. 15 is a cross-sectional view of the linking portion in a 90-degree opened state. FIG. 16 is a cross-sectional view of the linking portion in a 135-degree opened state. FIG. 17 is a cross-sectional view of the linking portion in a 180-degree opened state. FIG. 13 to FIG. 17 depict the cross section corresponding to the A-A cross section in FIG. 5 in each of the states. In FIG. 13 to FIG. 17, the upper casing 2 and the lower casing 3 in each state are represented by dashed lines.

Here, the cam crest of the cam 111 is the cam crest 510. Furthermore, the cam crest of the cam 121 is the cam crest 520. As depicted in FIG. 13, in the state in which the upper casing 2 and the lower casing 3 are closed, the cam crest 510 of the cam 111 is in a position away from the cam receiver 149 of the housing 140. Furthermore, in the state in which the upper casing 2 and the lower casing 3 are closed, the cam crest 520 of the cam 121 is in a position away from the cam receiver 150 of the housing 140. In this instance, a force is applied to the cylindrical member 116 and the cylindrical member 126 by the M-shaped spring 130 in the direction in which the rotation axis 20 and the rotation axis 30 become closer. Consequently, in this instance, a state is reached in which the rotation axis 20 and the rotation axis 30 are closest.

In addition, when the upper casing 2 and the lower casing 3 open, a force is applied to the linking member 110 and the linking member 120 for rotation from the state in FIG. 13 in the direction in which the linking member 110 and the linking member 120 move away from each other, in other words in the opening direction. Here, as depicted in FIG. 13, the inclination angle of the inclined section 511 at the side of the cam 111 that rides up the cam receiver 149 is larger than the inclination angle of the inclined section 521 at the side of the cam 121 that rides up the cam receiver 150. Therefore, the cam 111 has a larger load torque than the cam 121. Consequently, when the upper casing 2 and the lower casing 3 are opened, the inclined section 521 of the cam 121 rides up the cam receiver 150 before the inclined section 511 of the cam 111 rides up the cam receiver 149. In other words, the cam 121 starts to rotate before the cam 111.

Next, when the cam 121 rotates 45 degrees from the state in FIG. 13, the state in FIG. 14 is reached. In the rotation from the state in FIG. 13 to the state in FIG. 14, due to the rotation of the cam 121, the cam crest 520 rides up the cam receiver 150, and the linking member 120 is made to gradually move in the direction in which the rotation axis 20 of the linking member 120 moves away from the rotation axis 30 of the linking member 110. When the apex of the cam crest 520 of the cam 121 rides up the cam receiver 150, the distance between the linking member 120 and the linking member 110 is the largest. In the state in which the rotation axis 20, the edge section 22 of the upper casing 2, and the rotation axis 30 form one straight line, the distance L2 from the rotation axis 20 to the screen 31 of the lower casing 3 is greater than the distance L1 from the rotation axis 20 to the edge section 22. This state is the state in which the upper casing 2 is closest to the lower casing 3 in the rotation of the linking member 120, and by ensuring that in this state the edge section 22 does not come into contact with the screen 31 of the lower casing 3, it is possible for the upper casing 2 to rotate without interfering with the lower casing 3. Furthermore, during this process, because the load torque of the cam 111 is larger than the load torque of the cam 121, a state is maintained in which the cam crest 510 abuts the cam receiver 149, and the linking member 110 stops and does not rotate.

Next, when the cam 121 further rotates 45 degrees from the state in FIG. 14 in the opening direction, the state in FIG. 15 is reached. Due to the rotation from the state in FIG. 14 to the state in FIG. 15, the cam crest 520 of the cam 121 comes away from the cam receiver 150. Thus, due to the restoring force produced by the M-shaped spring 130, the linking member 120 is made to move in the direction in which the rotation axis 20 of the linking member 120 approaches the rotation axis 30 of the linking member 110. The distance between the rotation axis 20 of the linking member 120 and the rotation axis 30 of the linking member 110 in the state in FIG. 15 is the same distance as in the closed state. In addition, the state in FIG. 15 corresponds to the state in FIG. 10, in which the stopper 123 of the linking member 120 abuts the housing 140, and the linking member 120 is restricted from rotating. Therefore, the linking member 110, which has a large torque, starts to rotate from this state. In other words, the inclined section 511 of the cam crest 510 of the cam 111 rides up the cam receiver 149.

Next, when the cam 111 further rotates 45 degrees from the state in FIG. 15, the state in FIG. 16 is reached. In the rotation from the state in FIG. 15 to the state in FIG. 16, due to the rotation of the cam 111, the cam crest 510 rides up the cam receiver 149, and the linking member 110 is made to gradually move in the direction in which the rotation axis 30 of the linking member 110 moves away from the rotation axis 20 of the linking member 120. When the apex of the cam crest 510 of the cam 111 rides up the cam receiver 149, the distance between the linking member 110 and the linking member 120 is the largest. In the state in which the rotation axis 20, the edge section 32 of the lower casing 3, and the rotation axis 30 form one straight line, the distance L4 from the rotation axis 30 to the screen 21 of the upper casing 2 is greater than the distance L3 from the rotation axis 30 to the edge section 32. This state is the state in which the lower casing 3 is closest to the upper casing 2 in the rotation of the linking member 110, and by ensuring that in this state the edge section 32 does not come into contact with the surface 23 of the upper casing 2, it is possible for the lower casing 3 to rotate without interfering with the upper casing 2.

Next, when the cam 111 further rotates 45 degrees from the state in FIG. 16, the state in FIG. 17 is reached. Due to the rotation from the state in FIG. 16 to the state in FIG. 17, the cam crest 510 of the cam 111 comes away from the cam receiver 149. Thus, due to the restoring force produced by the M-shaped spring 130, the linking member 110 is made to move in the direction in which the rotation axis 30 of the linking member 110 approaches the rotation axis 20 of the linking member 120. The distance between the rotation axis 30 of the linking member 110 and the rotation axis 20 of the linking member 120 in the state in FIG. 17 is the same distance as when the upper casing 2 and the lower casing 3 are closed. In addition, the state in FIG. 17 corresponds to the state in FIG. 12, the stopper 113 of the linking member 110 abuts the wall 404 of the housing 140, and the stopper 123 of the linking member 120 abuts the wall 403 of the housing 140. Therefore, the upper casing 2 and the lower casing 3 are restricted from rotating from this state in the direction of further opening. In other words, the linking member 110 and the linking member 120 do not open any further.

Next, the instance where the upper casing 2 and the lower casing 3 are closed is described in the order of FIG. 17 to FIG. 13. When the upper casing 2 and the lower casing 3 are closed, a force is applied to the linking member 110 and the linking member 120 for rotation from the state in FIG. 17 in the direction in which the linking member 110 and the linking member 120 become closer, in other words in the closing direction. Here, as depicted in FIG. 17, the inclination angle of the inclined section 512 at the side of the cam 111 that rides up the cam receiver 149 is larger is smaller than the inclination angle of the inclined section 522 at the side of the cam 121 that rides up the cam receiver 150. Therefore, the cam 121 has a larger load torque than the cam 111. Consequently, the cam 111 starts to rotate before the cam 121. The inclined section 512 of the cam 111 rides up the cam receiver 149 before the inclined section 522 of the cam 121 rides up the cam receiver 150.

Next, when the cam 111 further rotates 45 degrees from the state in FIG. 17 in the closing direction, the state in FIG. 16 is reached. In the rotation from the state in FIG. 17 to the state in FIG. 16, due to the rotation of the cam 111, the cam crest 510 rides up the cam receiver 149, and the linking member 110 is made to gradually move in the direction in which the rotation axis 30 of the linking member 110 moves away from the rotation axis 20 of the linking member 120. When the apex of the cam crest 510 of the cam 111 rides up the cam receiver 149, the distance between the linking member 110 and the linking member 120 increases to the largest and the state in FIG. 16 is reached.

Next, when the cam 111 further rotates 45 degrees from the state in FIG. 16 in the closing direction, the state in FIG. 15 is reached. Due to the rotation from the state in FIG. 16 to the state in FIG. 15, the cam crest 510 of the cam 111 comes away from the cam receiver 149. Thus, due to the restoring force produced by the M-shaped spring 130, the linking member 110 is made to move in the direction in which the rotation axis 30 of the linking member 110 approaches the rotation axis 20 of the linking member 120. The distance between the rotation axis 20 of the linking member 120 and the rotation axis 30 of the linking member 110 in the state in FIG. 15 is the same distance as when the upper casing 2 and the lower casing 3 have closed. In addition, when the upper casing 2 and the lower casing 3 are closed from the state in FIG. 15, because the stopper 113 of the linking member 110 abuts the housing 140, and the linking member 110 is restricted from rotating as depicted in FIG. 9, the linking member 120 starts to rotate.

Next, when the cam 121 further rotates 45 degrees from the state in FIG. 15 in the closing direction, the state in FIG. 14 is reached. In the rotation from the state in FIG. 15 to the state in FIG. 14, due to the rotation of the cam 121, the cam crest 520 rides up the cam receiver 150, and the linking member 120 is made to move in the direction in which the rotation axis 20 of the linking member 120 moves away from the rotation axis 30 of the linking member 110. When the apex of the cam crest 520 of the cam 121 rides up the cam receiver 150, the distance between the linking member 120 and the linking member 110 increases to the largest and the state in FIG. 14 is reached.

Next, when the cam 121 further rotates 45 degrees from the state in FIG. 14 in the closing direction, the state in FIG. 13 is reached. Due to the rotation from the state in FIG. 14 to the state in FIG. 13, the cam crest 520 of the cam 121 comes away from the cam receiver 150. Thus, due to the restoring force produced by the M-shaped spring 130, the linking member 120 is made to move in the direction in which the rotation axis 20 of the linking member 120 approaches the rotation axis 30 of the linking member 110. The distance between the rotation axis 30 of the linking member 110 and the rotation axis 20 of the linking member 120 in the state in FIG. 13 is the same distance as when the upper casing 2 and the lower casing 3 have closed.

As described above, in the electronic device according to the present embodiment, during rotation the space between rotation axes is widened using cams, casings move to positions where the casings do not interfere with each other, and after rotation the space between the rotation axes is restored by the force of a spring. By moving the two casings away from each other during rotation, and bringing the casings close together after rotation, it is possible for rotation to be performed smoothly while reducing the space between the casings when the rotation has finished. By reducing the space between the casings when the rotation has finished, if screens are arranged in the upper casing and the lower casing, the space between both screens is shorter when the upper casing and the lower casing have been completely opened, and it is possible to obtain a sense of unity between the screens when the two screens are used as a single screen.

In the above, although an M-shaped spring is used as a member that shortens the distance between the linking member 110 and the linking member 120 that have been moved apart by the cams, another member may be used here as long as the member applies a force to the linking member 110 and the linking member 120 in the direction in which the rotation axis 20 and the rotation axis 30 become closer. For example, an elastic body such as a coil spring or the like may be arranged between the linking member 110 and the linking member 120. In addition, a member that presses the linking member 110 toward the linking member 120 from the side opposite the linking member 120, and a member that presses the linking member 120 toward the linking member 110 from the side opposite the linking member 110 may be arranged.

In the present embodiment, the load torques of the cam 111, the cam 112, the cam 121, and the cam 122 are adjusted so that the linking member 110 and the linking member 120 rotate in sequence. If the sequence in which the linking member 110 and the linking member 120 rotate is not set by altering the load torques, there is a risk that the cam at the lower casing 3 side of the hinge 1B will move at the same time as when the cam at the upper casing 2 side of the hinge 1A moves, for example. In this instance, there is a risk of the casings twisting, and opening and closing becoming difficult or the casings and the hinges being damaged. In other words, by making the linking member 110 and the linking member 120 rotate in sequence as in the present embodiment, it is possible to ensure ease of opening and closing, and to reduce damage to the casings and the hinges. However, if the casings and the hinges have high rigidity and if it is certain that an operator will perform opening and closing in a careful manner and so on, the load torques of the cam 111, the cam 112, the cam 121, and the cam 122 do not have to be differed.

Furthermore, in the present embodiment, the load torques of the cam 111, the cam 112, the cam 121, and the cam 122 are adjusted such that the upper casing 2 opens first during opening, and the lower casing 3 closes first during closing. This is because, when the lower casing 3 is placed on a flat surface, if the upper casing 2 rotates when the lower casing 3 has finished rotating in the opening direction, there is a risk that the upper casing 2 will protrude considerably in the direction of the surface on which the lower casing 3 is placed, and it will no longer be possible to place the lower casing 3 in a flat manner. However, if the lower casing 3 does not have to be placed in a flat manner, the order in which rotation occurs is not restricted to this. For example, the load torques of the cams may be adjusted such that the upper casing 2 rotates first at either the opening or the closing timing.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An electronic device comprising:
   a first casing rotatably supported by a first rotation axis;
   a second casing rotatably supported by a second rotation axis that is parallel to the first rotation axis;
   a first cam that is provided on the first rotation axis, rotates about the first rotation axis in accordance with rotation of the first casing, and causes the first casing to move together with the first rotation axis in a direction away from the second rotation axis;
   a second cam that is provided on the second rotation axis, rotates about the second rotation axis in accordance with rotation of the second casing, and causes the second casing to move together with the second rotation axis in a direction away from the first rotation axis; and
   an elastic member that applies a force in a direction in which the first rotation axis and the second rotation axis become closer,
   wherein the first and second cams each having a cam crest formed such that an inclination angle of one inclined surface being smaller than an inclination angle of another inclined surface,
   wherein the elastic member is an M-shaped spring that has bent sections in which the first rotation axis and the second rotation axis are separately housed.

2. The electronic device according to claim 1,
   wherein the first cam causes the first rotation axis to move to a position where the first casing does not interfere with the second casing when the first casing rotates,
   and the second cam causes the second rotation axis to move to a position where the second casing does not interfere with the first casing when the second casing rotates.

3. The electronic device according to claim 1,
   wherein the first cam protrudes from the first rotation axis toward a first edge section of the first casing that faces the second casing when the first casing rotates,
   and the second cam protrudes from the second rotation axis toward a second edge section of the second casing that faces the first casing when the second casing rotates.

4. The electronic device according to claim 3,
   wherein the first cam has a height such that, in a state in which the first casing rotates and the apex of a cam crest is positioned on a straight line that joins the first rotation axis and the second rotation axis, the distance obtained by adding the distance from the first rotation axis to the apex of the cam crest of the first cam and the distance from the second rotation axis to the apex of the cam crest of the first cam is longer than the distance obtained by adding the distance from the apex of the first edge section to the first rotation axis and the distance from a surface of the second casing that faces the first casing when the first casing rotates, to the second rotation axis,
   and the second cam has a height such that, in a state in which the second casing rotates and the apex of a cam crest is positioned on a straight line that joins the first rotation axis and the second rotation axis, the distance obtained by adding the distance from the first rotation axis to the apex of the cam crest of the second cam and the distance from the second rotation axis to the apex of the cam crest of the second cam is longer than the distance obtained by adding the distance from the apex of the second edge section to the second rotation axis and the distance from a surface of the first casing that faces the second casing to the first rotation axis.

5. The electronic device according to claim 1,
   wherein, in the first cam and the second cam, the load torque when the first casing turns and the load torque when the second casing turns are different.

6. The electronic device according to claim 5,
   wherein, in the first cam and the second cam, when the first casing and the second casing open, the load torque when the first casing turns is less than the load torque when the second casing turns, and when the first casing and the second casing close, the load torque when the first casing turns is greater than the load torque when the second casing turns.

7. The electronic device according to claim 6,
   wherein, the inclination angle at the side where a cam receiver for the first cam is pressed when the first casing and the second casing open is less than the inclination angle at the side where a cam receiver for the second cam is pressed, and the inclination angle at the side where the cam receiver for the first cam is pressed when the first casing and the second casing close is greater than the inclination angle at the side where the cam receiver for the second cam is pressed.

* * * * *